(12) United States Patent
Womer (10) Patent No.: US 6,547,431 B1
(45) Date of Patent: Apr. 15, 2003

(54) MIXING SECTION FOR A FEED SCREW AND METHODS OF MAKING THE SAME

(75) Inventor: Timothy W. Womer, Edinburg, PA (US)

(73) Assignee: Milacron Inc., Cincinnati, OH (US)

( * ) Notice: Subject to any disclaimer, the term of this patent is extended or adjusted under 35 U.S.C. 154(b) by 0 days.

(21) Appl. No.: 09/710,109

(22) Filed: Nov. 9, 2000

(51) Int. Cl.[7] .................................................. B29B 7/42
(52) U.S. Cl. .............................. 366/81; 366/88; 366/90
(58) Field of Search .............................. 366/81, 88, 90, 366/322, 323, 324; 425/208, 209

(56) References Cited

U.S. PATENT DOCUMENTS

| | | | |
|---|---|---|---|
| 3,006,029 A | * | 10/1961 | Saxton |
| 3,375,549 A | | 4/1968 | Geyer |
| 3,445,890 A | | 5/1969 | Heston et al. |
| 3,570,654 A | | 3/1971 | Hill |
| 3,652,064 A | * | 3/1972 | Lehnen et al. |
| 3,687,423 A | | 8/1972 | Koch et al. |
| 3,690,623 A | * | 9/1972 | Boyne |
| 3,941,535 A | | 3/1976 | Street .......................... 425/208 |
| 4,215,978 A | | 8/1980 | Takayama et al. .......... 425/190 |
| 4,752,136 A | | 6/1988 | Colby ............................ 366/89 |
| 5,044,759 A | | 9/1991 | Gagliani ....................... 366/88 |
| 5,215,764 A | | 6/1993 | Davis et al. ................. 425/208 |
| 5,318,357 A | * | 6/1994 | Colby et al. |
| 5,816,698 A | | 10/1998 | Durina et al. ................. 366/81 |
| 5,961,209 A | | 10/1999 | Kovacevic .................... 366/89 |

* cited by examiner

*Primary Examiner*—Charles E. Cooley
*Assistant Examiner*—David Sorkin
(74) *Attorney, Agent, or Firm*—Stephen H. Friskney (57) ABSTRACT

A mixing section for a feed screw includes a body portion defined along a longitudinal axis. The mixing section further includes a primary flight defining a helical channel, wherein the primary flight is helically wound in a first direction about the longitudinal axis. The primary flight forms a first acute angle with respect to a first plane including the longitudinal axis and defines a cross channel to allow fluid communication between adjacent portions of the helical channel. The cross channel is defined along a second plane such that the second plane forms a second acute angle with respect to the first plane. The first and second acute angles are located in the same quadrant and the second angle is less than the first angle.

33 Claims, 9 Drawing Sheets

MIXING SECTION FOR A FEED SCREW AND METHODS OF MAKING THE SAME

BACKGROUND OF THE INVENTION

1. Field of the Invention

This invention relates generally to feed screws, and more particularly to a mixing section for a feed screw.

2. Description of the Related Art

Certain embodiments of feed apparatus are known in the art for melting and conveying polymeric material within a cylinder from an inlet to a discharge opening. For instance, conventional extruder and injection screws typically include a feed section, a transition section and a metering section. The conventional screws are rotatable within a cylindrical barrel such that polymer material is conveyed along the barrel. Resin is conveyed from the feed section to the transition section wherein the polymeric material is typically melted with the aid of an external heat source such that the polymeric particles achieve a melted or molten state. The polymeric material then enters the transition section where the volume per unit of length is reduced until the material reaches the metering section. Final melting of any previously unmelted particles is completed as the polymeric material passes through the metering section.

It is desirable to modify the metering section to encourage sufficient mixing of the polymeric material prior to discharge through the discharge opening such that the discharged material is fully melted, homogeneously mixed and uniform in temperature, viscosity, color and composition.

U.S. Pat. No. 5,816,698 to Durina et al. issued Oct. 6, 1998, discloses a feed screw with a metering section wherein the primary flight includes cross channels for communication of material between adjacent portions of a helical channel defined by the primary flight. The metering section is designed such that the cross channel is defined by a continuous transit cut-through channel extending through the metering section in a reverse helical direction with respect to the helical direction of the primary flight. As molten material is advanced by the helical flight, a reverse flow of molten material occurs through the cross channel, thereby recirculating portions of the molten material. However, the prior art fails to disclose a primary flight including a cross channel wherein mixing section may be rotated such that the primary flight causes movement of material at least primarily in the first direction while a mixing segment may cause at least partial cross flow of material through the cross channel substantially in the same direction.

SUMMARY OF THE INVENTION

Accordingly, it is an object of the present invention to address and obviate problems and shortcomings of conventional feed screws. More particularly, it is an object of the present invention to provide a mixing section adapted to prevent thermal degradation.

It is another object of the invention to provide a mixing section that encourages chaotic mixing prior to discharging the material.

The above objects are provided merely as examples, and are not limiting nor do they define the present invention nor necessarily apply to every embodiment thereof.

To achieve the foregoing and other objects in accordance with the present invention, a mixing section for a feed screw is provided. The mixing section includes a body portion defined along a longitudinal axis and a primary flight defining a helical channel. The primary flight is helically wound in a first direction about the longitudinal axis and forms a first acute angle with respect to a first plane including the longitudinal axis. The primary flight defines a cross channel to allow fluid communication between adjacent portions of the helical channel. The cross channel is defined along a second plane such that the second plane forms a second acute angle with respect to the first plane. The first and second acute angles are located in the same quadrant and the second angle is less than the first angle.

To achieve further objects of the present invention, a mixing section for a feed screw. The mixing section includes an elongated body including a length extending along a longitudinal axis and a primary flight extending from at least a portion of the length of the elongated body. The primary flight is helically wound about the longitudinal axis to define a helical channel. The primary flight is helically wound in a first direction about the longitudinal axis along at least a portion of the length of the mixing section. The primary flight defines a cross channel to allow fluid communication between adjacent portions of the helical channel. The mixing section further includes a mixing segment extending from the elongated body. The mixing section is adapted to be rotated about the longitudinal axis such that the primary flight may cause movement of material at least primarily in the first direction while the mixing segment may cause at least partial cross flow of material through the cross channel substantially in the first direction.

To achieve further objects of the present invention, a process for making a mixing segment from an elongated cylindrical or conical screw body is disclosed. After providing a cylindrical or conical body, a primary helical flight is defined by defining a first helical groove in the body to define a lead side of the primary helical flight. A second helical groove is further defined in the body to define a trail side of the primary helical flight. The mixing helical flight may be defined by defining a third helical groove in the body to define a lead side of the mixing helical flight and defining a fourth helical groove in the body to define a trail side of the mixing helical flight, wherein the mixing helical flight is defined with a pitch that is greater than the pitch of the primary helical flight. Additional portions of the elongated cylindrical or conical body are then removed to complete the process.

Still other advantages and objects of the present invention will become apparent to those skilled in the art from the following description wherein there are shown and described alternative exemplary embodiments of this invention. As will be realized, the invention is capable of other different, obvious aspects, objects and embodiments, all without departing from the scope of the invention. Accordingly, the drawings, objects and descriptions should be regarded as illustrative and exemplary in nature only, and not as restrictive.

DESCRIPTION OF THE PREFERRED EMBODIMENTS

Figure 1:
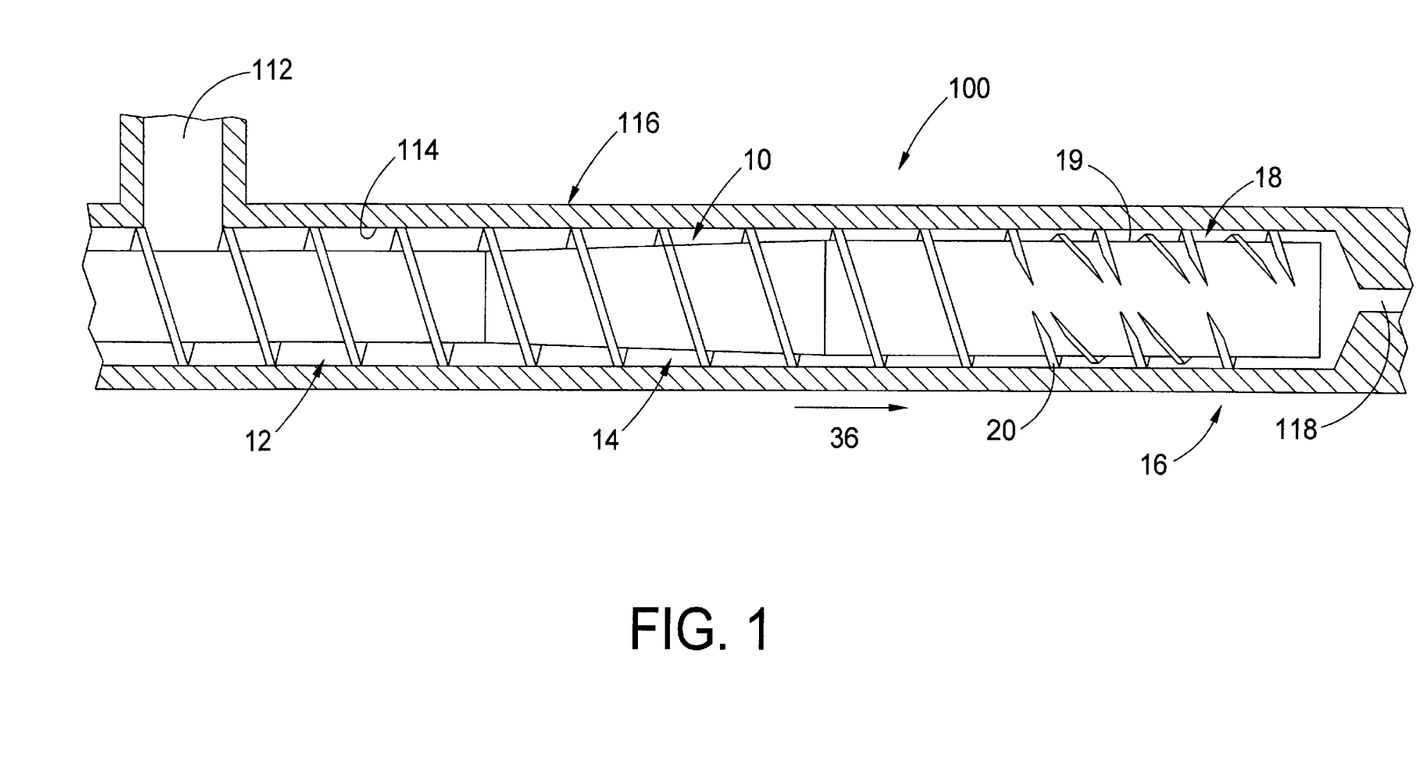
FIG. 1 is a partial sectional view of portions of an exemplary feed apparatus in accordance with the present invention.

Turning now to the drawing figures, wherein the same element numbers indicate the same or corresponding structures throughout the views, FIG. 1 illustrates a feed apparatus 100 in accordance with one embodiment of the present invention. As shown in FIG. 1, the feed screws of the present invention may be used in an apparatus similar to the plasticating apparatus disclosed in U.S. Pat. No. 5,816,698 to Durina et al. issued on Oct. 6, 1998, the entire disclosure of which is hereby incorporated by reference herein.

The feed apparatus 100 may include a barrel 116 that houses a feed screw 10 such that the outer edge of the primary flight 20 is located adjacent the inner surface 114 of the barrel 116. The feed apparatus 100 further includes an inlet 112 and a discharge 118 as described more fully below. It is understood that the feed screw concepts of the present invention might be used with various embodiments of a feed apparatus (e.g., with apparatus for injection molding, blow molding or extrusion, including twin screw extrusion). In addition, the concepts of the present invention may be used with both barrier and non-barrier type feed screws.

Feed screws in accordance with the present invention at least include a mixing section 18. The mixing section of each of the exemplary embodiments of the present invention may be removably attached to the feed screw. Alternatively, the mixing section may be formed as an integral part of the feed screw.

Figures 2, 2A:
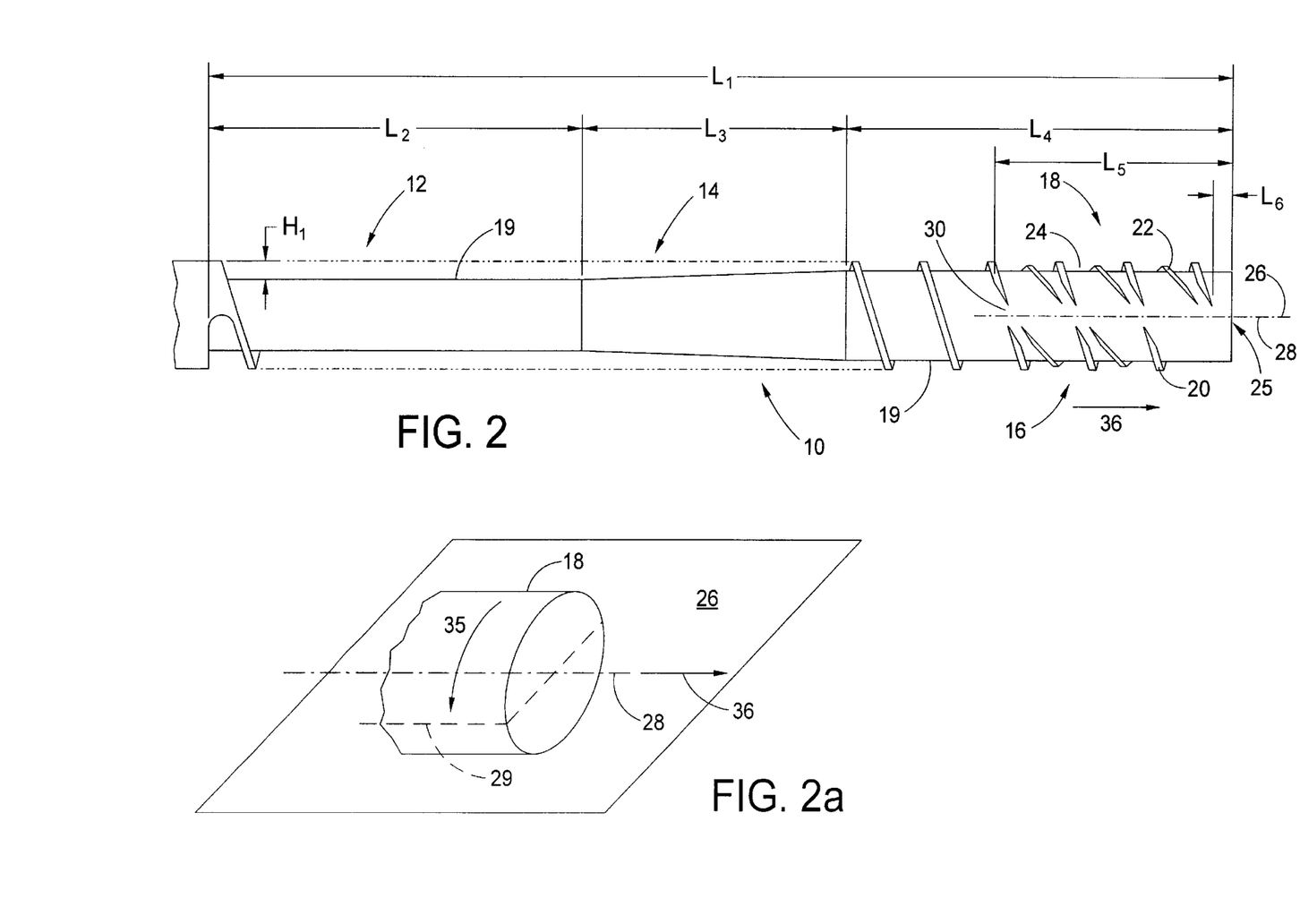
FIG. 2 is an elevational view of an exemplary feed screw in accordance with the present invention.
FIG. 2a is a partial perspective view of the mixing section without the mixing segments or primary flight illustrating a plane that includes the longitudinal axis of the feed screw.

In one particular embodiment, as shown in FIG. 2, the feed screw 10 may also include a feed section 12, a transition section 14 and a metering section 16. FIG. 2 depicts the primary flight 20 in detail extending the length of the metering section 16 while representing the primary flight 20 by phantom lines in the feed and transition sections 12, 14 for clarity. It is understood that the primary flight may extend along the entire length of the screw, substantially along the entire length of the screw, a segment less than the length of the screw or a plurality of segments arranged along the screw.

The particular dimensions of the feed screw 10 may vary according to the particular application of use. As shown in FIG. 2, for example, the feed screw may have a length $L_1$ equal to about 63.0 inches, with the feed section length $L_2$ equal to about 22.0 inches, the transition section length $L_3$ equal to about 24.6 inches, and the metering section length $L_4$ equal to about 16.4 inches. The mixing section length $L_5$ may be equal to about 11.6 inches. The feed screw 10 may also be provided with an outside diameter register $L_6$ of about 0.4 inches. As further illustrated in FIG. 2, the thread depth between the elongated body 19 and the outer edge of the primary lead 20 may be a constant depth $H_1$ of about 0.4 inches. Female threads may also be provided at 25 with an appropriate size depending on the particular dimensions and requirements of the feed screw 10.

As further illustrated in FIG. 1, the feed section 12 of the screw 10 is adapted to receive solid and/or liquid material and convey it along the barrel 116, such as a cylindrical barrel, of the feed apparatus 100. The solid and/or liquid may be exposed to heat during transport through the feed section 12 to promote melting and/or maintain melted material in a liquid or molten state. The transition section 14 further promotes melting of material and/or maintains melted material in a liquid state and is also adapted to gradually reduce the volume of material being transported per unit of length until it reaches the metering section 16. For instance, as shown in FIGS. 1 and 2, the transition section 14 may be frustoconically shaped to gradually reduce the volume of material being transported per unit of length.

The metering section 16 may include a primary flight 20 extending from a body portion 19, such as an elongated body. In one exemplary embodiment, the body portion 19 is generally cylindrical. However it is understood that the body portion 19 may be formed as elongated members that are symmetrical or non-symmetrical with reference to a longitudinal axis (e.g., longitudinal axis 28). The body portion 19 could also be solid or hollow. For instance, the body portion 19 could be formed as a hollow tube or a solid rod to save material and/or reduce weight. In other examples, the body portion could be formed with a conical, or frustoconical shape to change the flow rate and/or the flow characteristics of the material conveyed. The exemplary elongated body portion 19 depicted in the figures comprises a substantially circular cross section (i.e., thereby forming an elongated cylindrical or conical member). It is understood that other cross sectional shapes may be provided to alter the three dimensional shape of the body portion. For example, the elongated body portion could be formed with cross sections in the shape of a polygon (e.g., a triangle; trapezoid; parallelogram such as a rhombus or square; or other polygon with four or more sides), oval shape, or other symmetrical or non-symmetrical shape.

The metering section 16 may include the mixing section 18 to provide a uniform positive fluid flow of material. The mixing section 18 promotes both distributive and chaotic (e.g., turbulent) mixing action with a positive flow of molten fluid material, thereby reducing the possibility of "dead" spots where the fluid flow could stagnate and thereby degrade and further preventing inconsistent fluid properties throughout mixing section 18. Thus, "chaotic" and/or "distributive" mixing throughout this application may include any mixing action that assists in obtaining a material that is more uniform in temperature, viscosity, color and/or composition. It will be appreciated that "chaotic and distributive mixing" may help obtain a more homogenous mixture of material prior to discharge of material from the feed apparatus.

Figures 3, 3A, 3B:
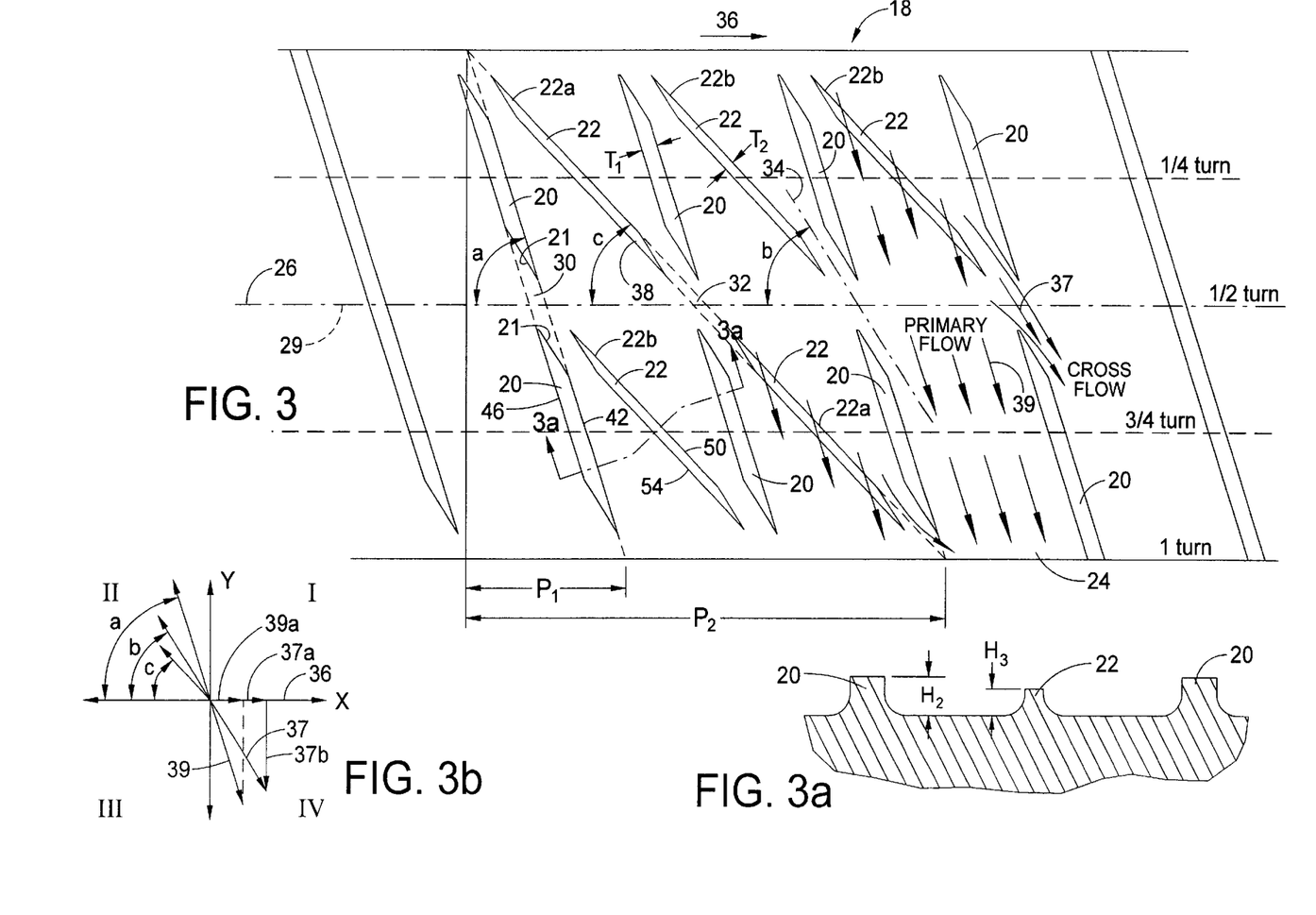
FIG. 3 is a planar plan view of the outer surface of the mixing section of the exemplary feed screw of FIG. 2.
FIG. 3a is a partial sectional view of the exemplary mixing section along line 3a—3a of FIG. 3.
FIG. 3b is a Cartesian coordinate system illustrating the acute angles of the primary flight, mixing segment, and cross channel of the primary flight all located in the second Cartesian quadrant.

FIG. 3 depicts a planar view of the outer surface of the mixing section 18 in accordance to exemplary embodiments of the present invention. The primary flight 20 of the mixing section 18 may include one or more cross channels 30 to allow fluid communication between adjacent portions of the helical channel 24. In certain exemplary embodiments of the present invention, the mixing section 18 may include a mixing segment 22 extending from the elongated body 19. As shown in FIG. 3, at least one end 38 of the mixing segment 22 is located adjacent a cross channel 30 wherein rotation of the mixing section 18 in one direction may allow the primary flight 20 to cause movement of material in at least primarily a first direction 36 while the mixing segment 22 may cause at least partial cross flow of material through the cross channel 30 substantially in the first direction 36.

Throughout this application, "substantially in the first direction" includes any directional vector having at least one component in the first direction 36. For example, as shown in FIG. 3b, the cross flow direction 37 has a flow component 37a along the x-axis and a flow component 37b along the y-axis. The first direction 36 is a vector extending in a positive direction along the x-axis. Thus, the cross flow 37 extends substantially in the first direction 36 since it has a component (i.e., 37a) extending in the first direction 36. Similarly, the primary flight 20 causes movement of material "at least primarily in the first direction" 36 since the primary flow 39 (as shown in FIGS. 3 and 3b) has a component 39a extending in a positive direction along the x-axis.

The thickness $T_1$ of the primary flight 20 and the thickness $T_2$ of the mixing segment 22 may be selected to accommodate the design requirement of the system. In one embodiment, the mixing segment 22 has a thickness $T_2$ of about the same thickness $T_1$ of the primary flight 20. In other embodiments, the thickness $T_2$ of the mixing segment 22 is less than the thickness $T_1$ of the primary flight 20 (e.g., wherein the mixing segment has a thickness $T_2$ between 0.5 and 1 times the thickness $T_1$ of the primary flight). In one particular embodiment, the mixing segment 22 has a thickness $T_2$ is 0.5 times the thickness $T_1$ of the primary flight 20. It will be appreciated that the thicknesses of the flights may be modified in order to accommodate the particular application. In one example, the thickness $T_1$ of the primary flight is one tenth the diameter of the metering section. For example, the primary flight lead may be about 3.0 inches while the primary flight thickness $T_1$ may be about 0.3 inches.

In addition, different relative heights may exist between the primary flight 20 and the mixing segment 22. It will be appreciated that the relative heights may be selected to increase or decrease the amount of cross flow. For example, an increased height $H_3$ of the mixing segment 22, relative to the height $H_2$ of the primary flight 20, will increase the cross flow of fluid between adjacent portions of the helical channel 24. As illustrated in FIG. 3a, in one embodiment, the height $H_2$ of the primary flight 20 is about twice the height $H_3$ of the mixing segment 22. For example, $H_2$ might be about 0.2 inches with $H_3$ being about 0.1 inches.

FIG. 3 depicts a particular example of an arrangement of a primary flight and one or more mixing segment(s) or mixing flight(s). It will be understood that other similar arrangements may also be encompassed by the teachings of this invention to achieve the mixing characteristics of the fluid flow as described herein.

FIG. 2a depicts the relationship between a horizontal first plane 26 and a longitudinal axis 28 of the feed screw 10. A portion of the mixing section 18 is shown in FIG. 2a without any mixing segments or primary flight for clarity. In particular, as shown in the perspective view of FIG. 2a, a horizontal first plane 26 extends through the mixing section 18 such that it includes the longitudinal axis 28. Moreover, an x-axis 29 is depicted that is parallel to the longitudinal axis 28 and extends along the first plane 26. As best illustrated in FIG. 3, the x-axis can extend through a plurality of cross channels of the primary and mixing flights. FIG. 2a also depicts a clockwise direction 35 in a first direction 36 that extends along the longitudinal axis 28.

FIG. 3 depicts a planar plan view of the outer surface of the mixing section. In this view, the primary flight 20 forms a first acute angle (a) with respect to the first plane 26. The angle (a) may be formed from the centerline of the primary flight 20. In certain circumstances, the angle (a) may also be formed with respect to the lead side 42 and/or the trail side 46 of the primary flight 20. Moreover, as best further illustrated in FIGS. 2 and 2a, the primary flight 20 is helically wound clockwise 35 in a first direction 36 along a primary flight helical path about the longitudinal axis 28 along at least a portion of the length of the mixing section 18. The primary flight helical path also forms the first acute angle (a) with respect to the x-axis 29.

As further illustrated in FIG. 3, the cross channel 30 of the primary flight 20 may be defined along a second plane 34 that extends relative to the first plane at a second angle (b). Moreover, as best further illustrated in FIGS. 2 and 2a, the cross channel 30 may be defined along a cross channel helical path. The cross channel helical path may be helically wound clockwise 35 in the first direction 36 about the longitudinal axis 28 along at least a portion of the length of the mixing section 18. The cross channel helical path also forms the second acute angle (b) with respect to the x-axis 29. The cross channel 30 may be defined by the side walls 21 of the primary flight and includes a region between the side walls 21 and the planes including the lead side 42 and the trail side 46 of the primary flight 20 (i.e., indicated by hidden lines in FIG. 3). In exemplary embodiments, one of the side walls 21 is defined along a plane that is parallel to the second plane 34. For example, as best shown in FIGS. 2, 2a and 3, one of the side walls 21 is parallel to the direction of the helical path. As illustrated, the helical path can comprise a common helical path that extends through a plurality of cross channels of the primary and mixing flights. In other embodiments, both side walls 21 are defined along offset planes that are parallel to the second plane 34. For example, as best illustrated in FIGS. 2, 2a and 3, both of the side walls 21 of the cross channel are parallel to the direction of the cross channel helical path.

The second angle (b) may be less than the first angle (a) in order to encourage cross flow in a flow direction 37 through the cross channel 30 of the primary flight 20 substantially in the first direction 36. In the embodiment illustrated, the first angle (a) and the second angle (b) are located in the same quadrant. As depicted in FIG. 3b, a quadrant throughout this application is defined as any of the four areas that a plane is divided by the reference axes of a Cartesian coordinate system. In a typical Cartesian coordinate system, as shown in FIG. 3b, with a horizontal x-axis and a vertical y-axis, by measuring 360° counterclockwise from the positive x-axis, the first quadrant (I) exists between 0° and 90°, the second quadrant (II) exists between 90° and 180°, the third quadrant (III) exists between 180° and 270°, and the fourth quadrant (IV) exists between 270° and 360°. As shown in FIGS. 3 and 3b, the first angle (a) and second angle (b) are both located in the second quadrant (II) when the plane 26 includes the x-axis and the angles are considered to be formed with respect to the origin. It will be appreciated the angles may exist in other quadrants depending upon the type of material being conveyed and the output requirements.

The mixing segment(s) or flight(s) 22 may extend relative to the first plane 26 at a third angle (c). The third angle (c) may be formed between the centerline of the mixing segment(s) or flight(s) 22 and the first plane 26. In certain embodiments, the third angle (c) may also be formed with respect to the lead side 50 and/or the trail side 54 of the mixing segment(s) or flight(s) 22. In one particular example, the lead side 50 and trail side 54 are parallel to one another. Moreover, as best further illustrated in FIGS. 2 and 2a, the mixing segment(s) or flight(s) 22 may extend along a mixing segment path, such as a mixing segment helical path. For example, the mixing segment path may be helically wound clockwise 35 in the first direction 36 about the longitudinal axis such that the mixing segment path comprises a helical path. The mixing segment path also forms the third acute angle (c) with respect to the x-axis 29.

As illustrated in FIGS. 3 and 3b, the first angle (a), second angle (b), and third angle (c) may all be located in the same quadrant (e.g., the second quadrant). Moreover, the third angle (c) may be less than the first angle (a) to allow the mixing segment 22 to at least partially interrupt the primary flow through the helical channel 24 to create at least partial cross flow through the cross channel 30 generally in the flow direction 37. The third angle (c) may optionally be less than the second angle (b). While different angles may be selected, one embodiment involves the angle (a) being about 72° with the angle (c) being about 46°.

As illustrated in the figures, an exemplary embodiment of the present invention involves a plurality of mixing segments 22 that define a mixing flight 22. As illustrated in FIG. 3, the primary flight 20 may comprise a first pitch $P_1$ while the mixing flight 22 may comprise a second pitch $P_2$ that is greater than the first pitch $P_1$ to encourage cross flow through the cross channel 30. In one particular example, $P_2$ may be three times the pitch of $P_1$. As shown in FIG. 3, the first pitch $P_1$ is equal to the screw diameter while the second pitch $P_2$ is equal to about three times the screw diameter.

Figure 7:
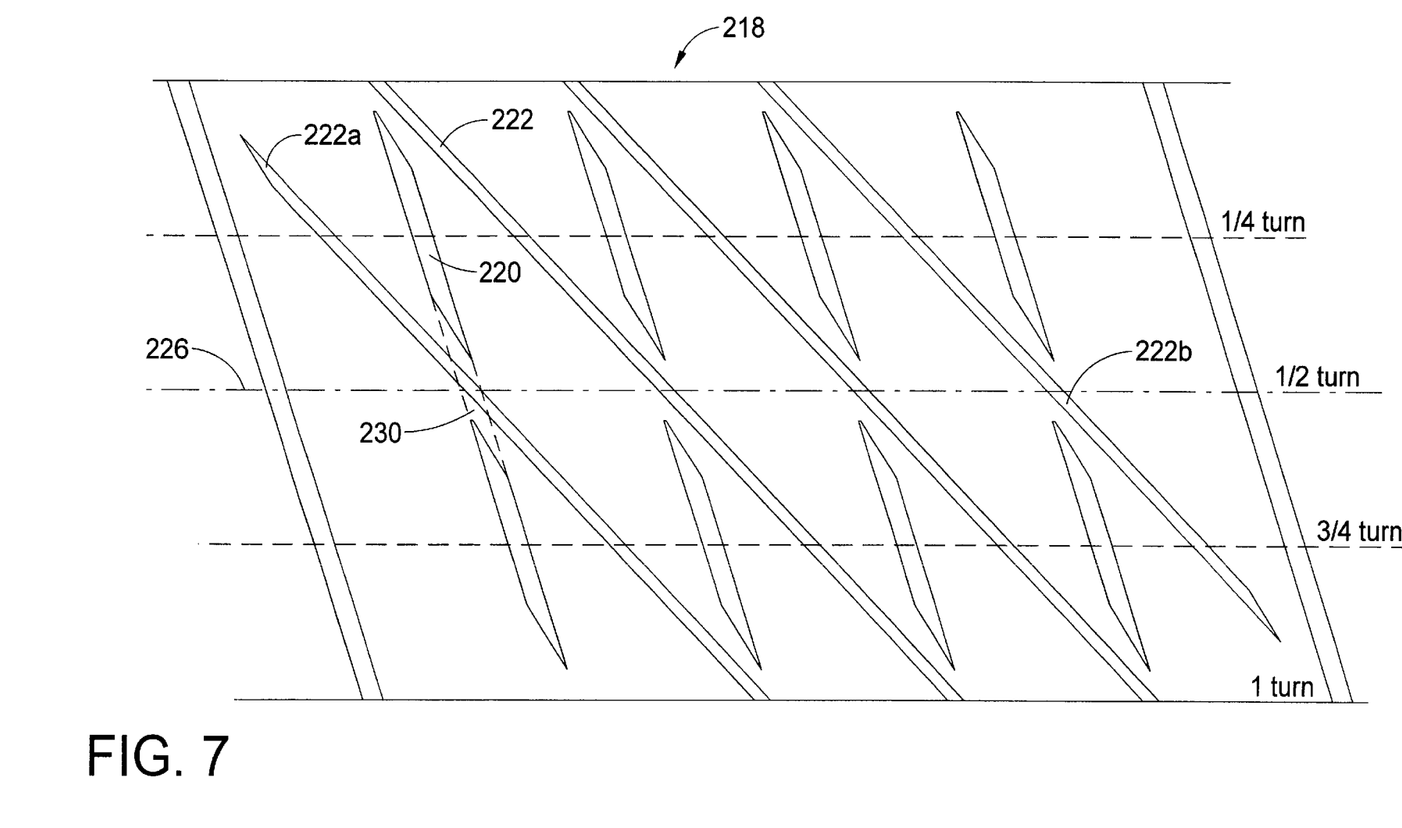
FIG. 7 is a planar plan view of the outer surface of the mixing section of another exemplary embodiment of a feed screw wherein the mixing segment extends through the cross channels of the primary flight.

FIG. 3 illustrates one complete mixing flight 22a with a plurality of partial mixing flights 22b. It is understood that the mixing section 18 may comprise a plurality of complete mixing flights, a plurality of partial mixing flights, and/or any combination of complete and partial mixing flights. In one example, as shown in FIG. 3, a plurality of mixing segments 22 define a mixing flight 22 with at least one cross channel 32 between adjacent mixing segments 22. Alternatively, the mixing section 18 might include one continuous flight (e.g., as shown in FIG. 7) that will be described more fully below.

Figure 4:
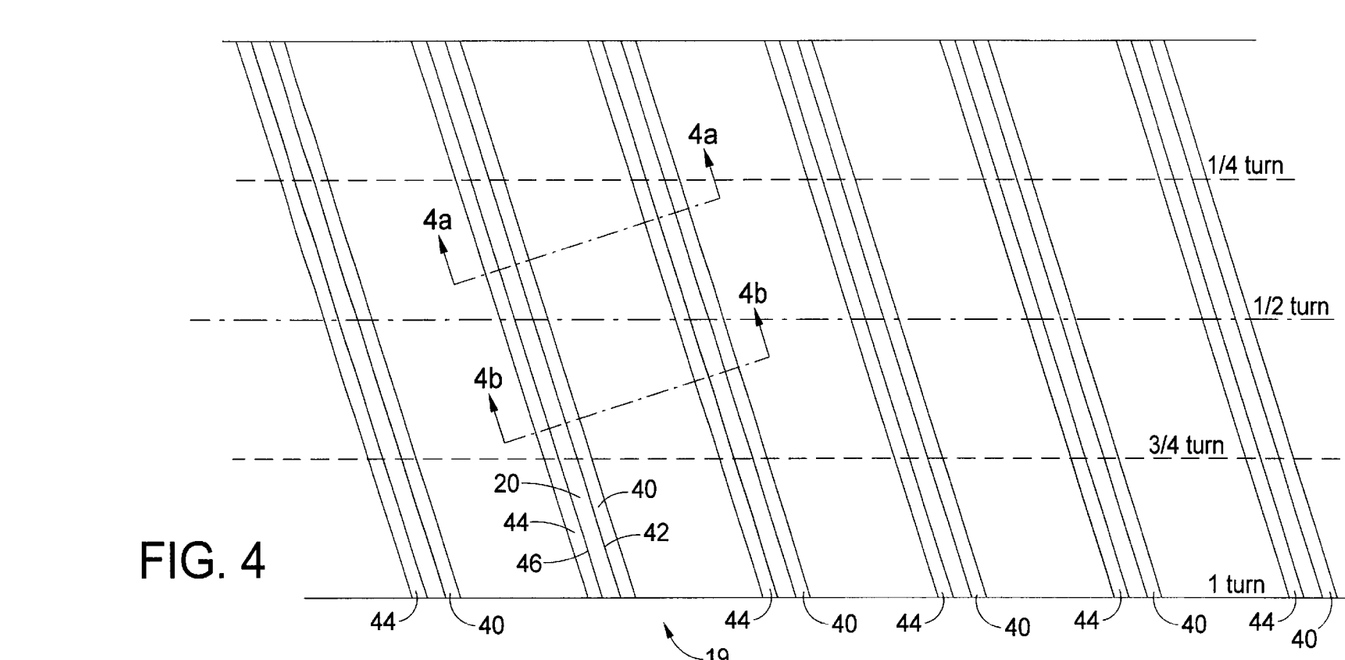
FIG. 4 illustrates an exemplary mixing segment including a primary helical flight defined therein according to an exemplary method of the present invention.
Figure 4A:
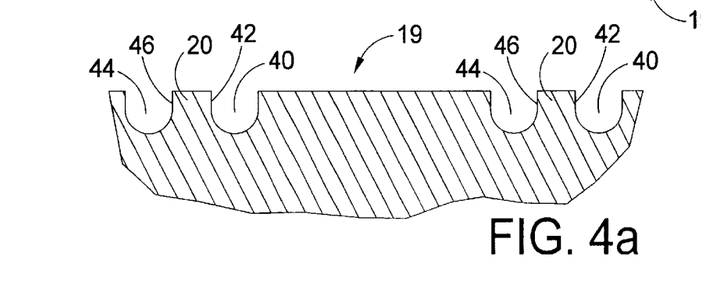
FIG. 4a is a partial sectional view along line 4a—4a of the mixing segment of FIG. 4.
Figure 5:
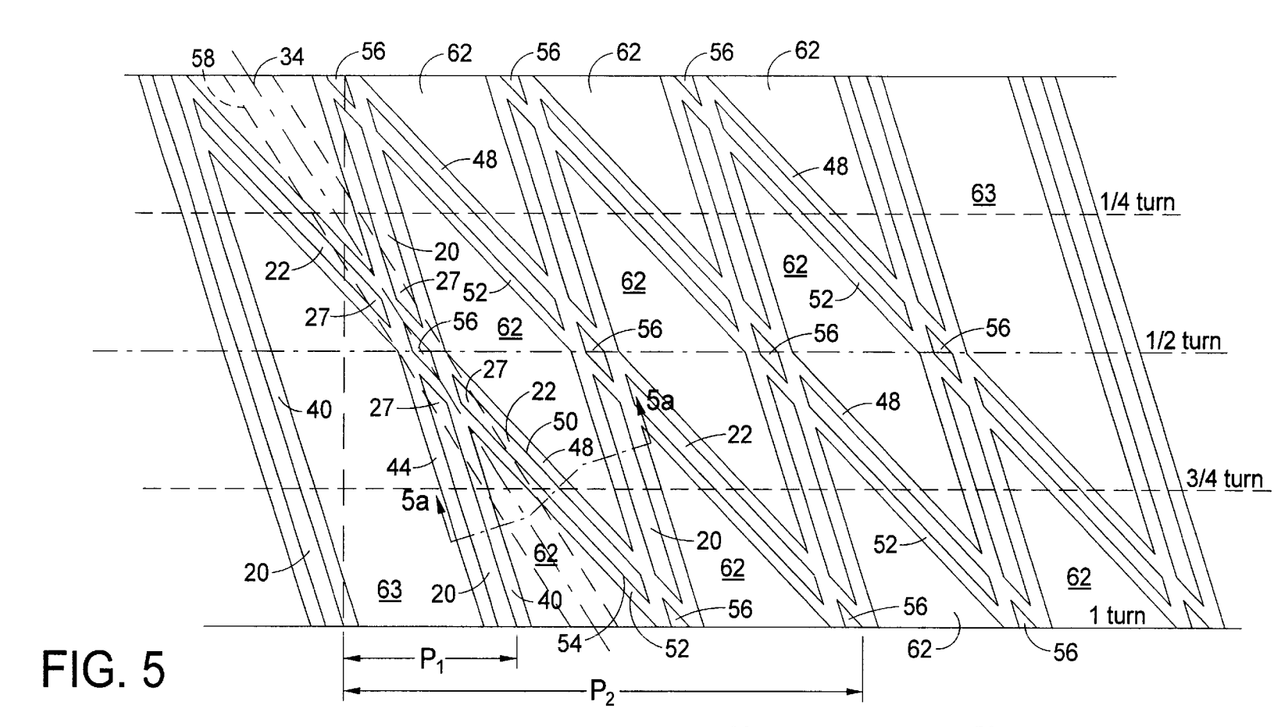
FIG. 5 illustrates the mixing segment of FIG. 4 after the mixing helical flight is defined therein according to an exemplary method of the present invention.
Figure 6:
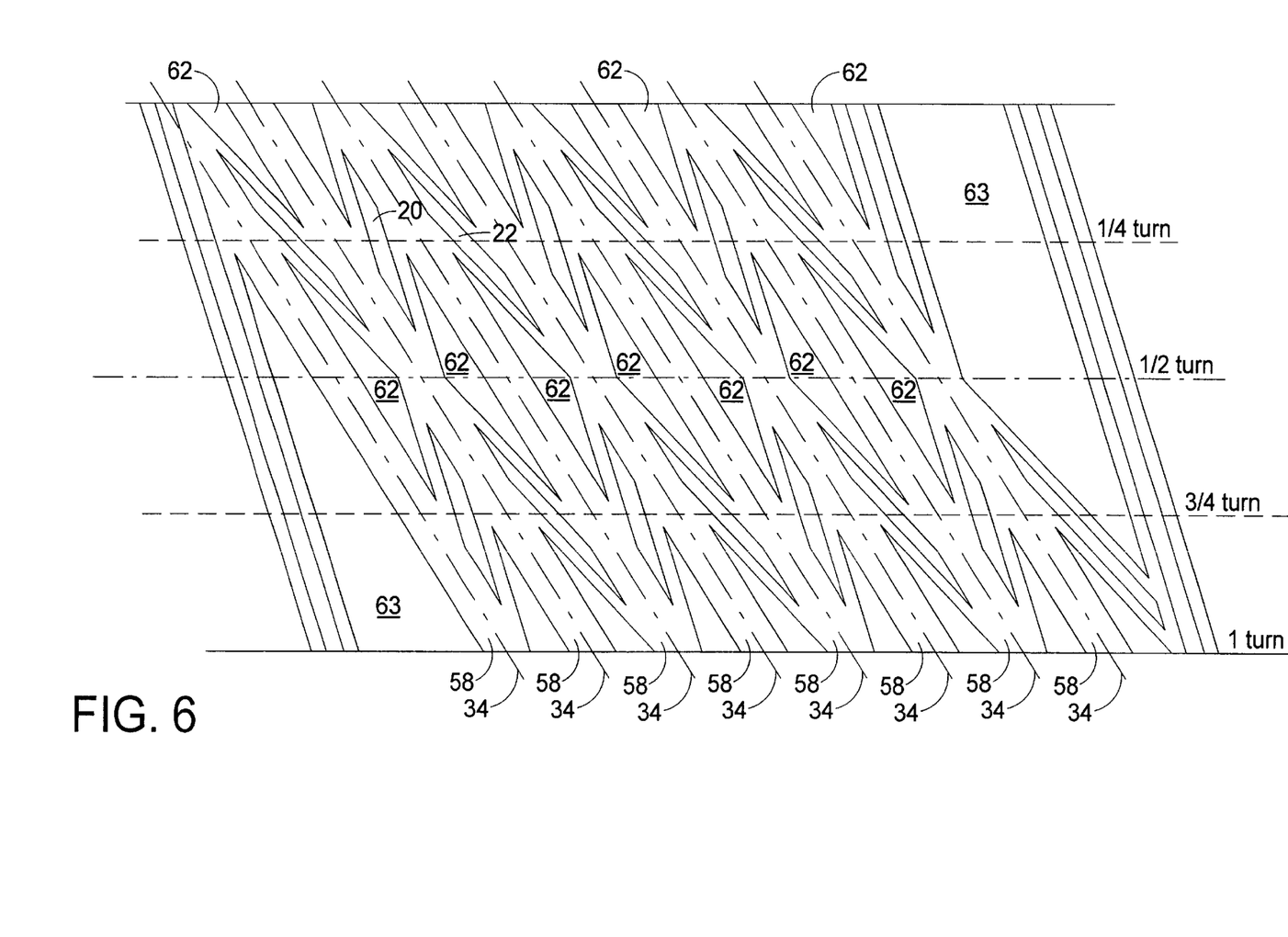
FIG. 6 illustrates the mixing segment of FIG. 5 after a cross channel helical groove has been defined therein to remove portions of the elongated member, according to an exemplary method of the present invention.

FIGS. 4–6 depict methods of making the mixing section 18 from a body portion 19 (e.g., an elongated cylindrical body). For clarity, the outer surface of the body portion is displayed in a planar plan view. After providing the body portion, a primary helical flight 20 is defined in the body portion as illustrated in FIGS. 4 and 4a. To define the primary helical flight 20, a first helical groove 40 is defined in the body portion 19 (e.g., at a first depth equal to the height of the primary helical flight 20). The first helical groove 40 defines a lead side 42 of the helical flight 20. A second helical groove 44 is also defined in the body portion 19 (e.g., at the first depth) to define a trail side 46 of the primary helical flight 20. The grooves 40 and 44 may be defined in the body portion 19, for example, by machining with a screw mill or other suitable tool.

Figure 4B:
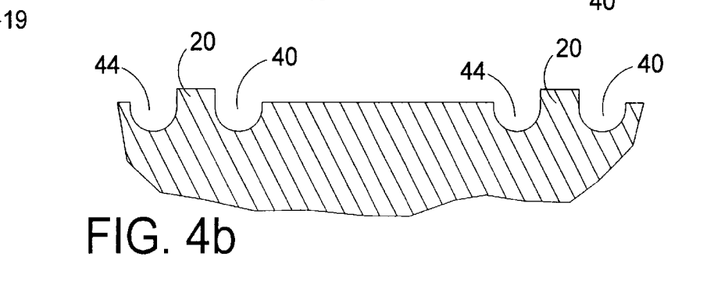
FIG. 4b is a partial sectional view along line 4b—4b of the mixing segment of FIG. 4 after an outer layer has been removed from portions of the elongated body.

As shown in FIG. 4b, an outer layer of the body portion 19 may be removed to reduce the height of the mixing helical flight 22 to be later defined from the body portion 19. Alternatively, an upper portion of the mixing helical flight 22 could be removed after the mixing helical flight 22 is defined. It should also be noted that the height of the mixing flight 22 does not have to be constant throughout the mixing section 18. The height can either increase or decrease over the progression of the mixing flight 22 to vary the shear (or work) applied to the material as it is advanced by the primary flight 20 through the mixing section 18 of the screw 10.

Figure 5A:
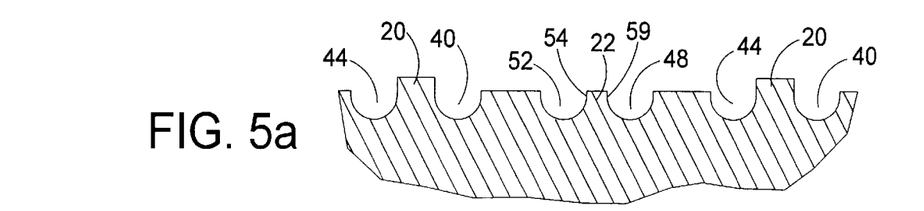
FIG. 5a is a partial sectional view along line 5a—5a of the mixing segment of FIG. 5.

Turning now to FIGS. 5 and 5a, the mixing helical fight 22 is defined by defining a third helical groove 48 in the body portion 19 (e.g., at the first depth) to define a lead side 50 of the mixing helical flight 22. A fourth helical groove 52 is also defined in the body portion 19 (e.g., at the first depth) to define a trail side 54 of the mixing helical flight 22. As illustrated in FIG. 5, the primary helical flight 20 has a pitch $P_1$ and the mixing helical flight 22 has a pitch $P_2$ that is greater than $P_1$ (e.g., $P_2$ may be three times the pitch of $P_1$).

As also illustrated in FIG. 5, the first and second helical grooves 40, 44 pass through the mixing helical flight 22 while the third and fourth helical grooves 48, 52 pass through the primary flight 20 such that the helical grooves 40, 44, 48, 52 define a rhombus portion 56 at the intersections of the primary helical flight 20 and mixing helical flight 22.

Additional portions of the elongated body are then removed. For instance, as illustrated in FIG. 6, a cross sectional groove 58 is defined along plane 34. In one embodiment, the cross sectional groove 58 is sufficiently wide to pass through the rhombus portions 56 of FIG. 5, portions of the primary and mixing helical flights 20, 22, and additional portions 62 of the elongated body. As shown in FIG. 6, the cross sectional groove 58 effectively removes the rhombus portions 56 of FIG. 5 while trimming end portions 27 of the primary and mixing flights 20, 22 (see FIG. 5). Subsequent machining (e.g., by carving, cutting, or other process) may be used to remove additional or undesirable intermediate portions 62, 63 of the elongated member (i.e., as shown in FIG. 6) to achieve desirable mixing of the fluid. Once the process is completed, the mixing section 18 is defined, for instance, as appears in FIGS. 3 and 3a.

It will be appreciated that the mixing section 18 illustrated in FIG. 3 is one of many possible embodiments that are covered by the present invention. For instance, FIGS. 7–9 illustrate other possible embodiments of the mixing segment within the scope of the present invention.

While many embodiments of the present invention illustrate the mixing segment(s) 22 and/or mixing flight(s) 22 defining cross channels 32 between adjacent mixing segments 22, it will be appreciated that one continuous mixing segment/flight may be provided. For example, as shown in FIG. 7, a mixing section 218 is provided that includes a primary flight 220 with cross channels 230. A continuous mixing segment/flight 222 is provided that extends through a plurality of the cross channels 230.

While the mixing segments 22 are arranged as a mixing flight (e.g., as illustrated in FIG. 3), it is understood that the mixing segments may additionally or alternatively be provided with different lengths and/or shapes and/or may be oriented at different angles relative to one another to direct a desired amount of fluid through the cross channel 30 of the primary flight 20. As shown in FIG. 8, a mixing section 318 may include a primary flight 320 with a plurality of mixing segments 322a–i. The mixing segments 322a–i illustrate various exemplary shapes of the mixing segments that may be used with any of the embodiments of the present invention. It will be understood that the shapes depicted in FIG. 8 are illustrative only and that the mixing segments may have other shapes in accordance with the present invention.

Figure 8:
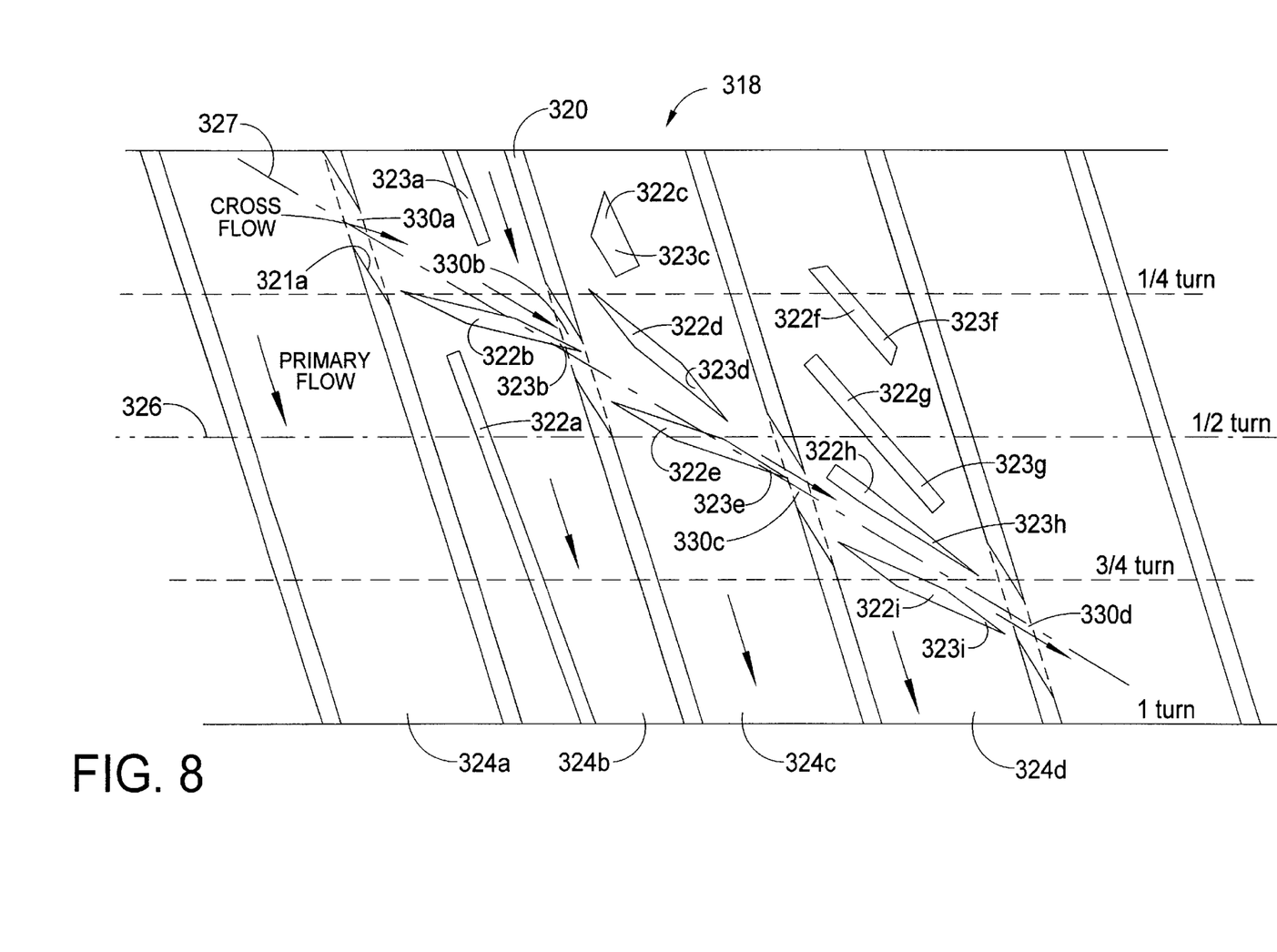
FIG. 8 is a planar plan view of the outer surface of the mixing section of yet another exemplary embodiment of a feed screw wherein the cross channels of the primary flight are aligned at an angle relative to the horizontal plane of the feed screw.
Figure 9:
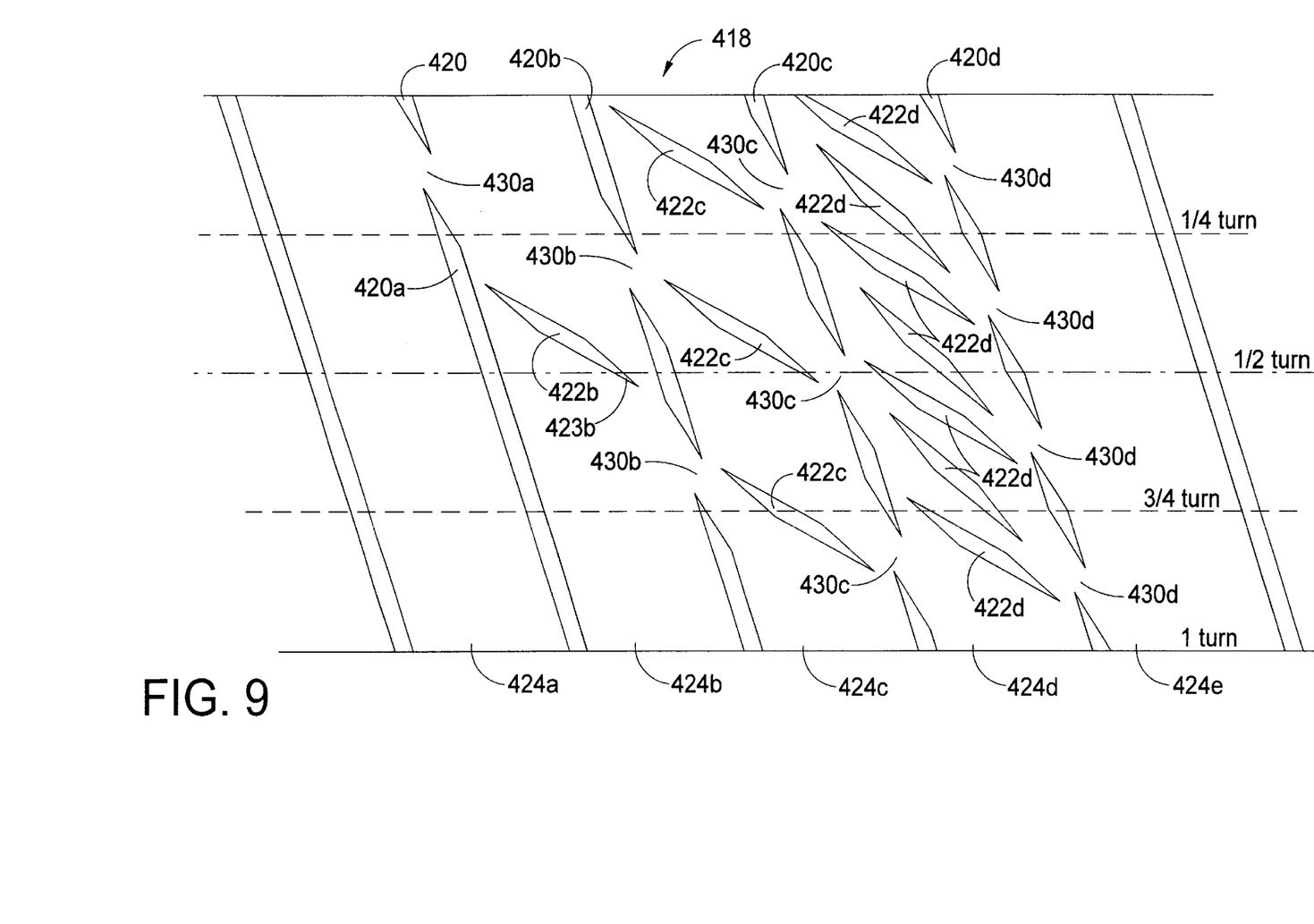
FIG. 9 is a planar plan view of the outer surface of the mixing section of still another exemplary embodiment of a feed screw wherein the cross channels of the primary flight are randomly oriented relative to one another.

As shown in FIG. 8, the various embodiments of the present invention may include mixing segments having four sides (e.g., in the shape of rectangular mixing segments 322a, 322g; rhombus mixing segments 322b, 322d, 322e, 322i; trapezoidal segments 322f, and shapes without parallel sides 322c) and/or mixing segments with three sides (e.g., the wedge shaped mixing segment 322h). While the mixing segments illustrated contain three or four sides, it is understood that the mixing segments of the present invention may be formed with any number of sides.

As further illustrated in FIG. 8, each full turn may include different numbers, if any, of mixing segments 322 in order to affect the mixing characteristics of the fluid passing through the mixing section 318. For example, as illustrated in FIG. 8, the first helical channel section 324a does not include any mixing segments. This arrangement permits minimal cross flow between the first channel section 324a and the second channel section 324b resulting from the shape of the first cross channel 330a. As the feed screw turns, the lower side wall 321a causes portions of the fluid from the primary flow to ramp into a cross flow through the first cross channel 330a, from the first channel section 324a to the second channel section 324b.

As illustrated in FIG. 8, the second, third and fourth channel sections 324b–d are each provided with an increased number of mixing segments to enhance the amount of cross flow through the corresponding cross flow channels 330b–d. Enhanced cross flow might be desirable in order to increase the degree mixing just prior to discharging the fluid from the feed apparatus. In one example, the second channel section 324b includes two mixing segments 322a, 322b, the third channel section 324c includes three mixing segments 322c–e, and the fourth channel section 324d includes four mixing segments 322f–i.

As further illustrated in FIG. 8, the mixing segments 322a–i may have end portions 323a–i that feed material at least partially to another mixing segment and/or encourage material through the cross channels 330a–d. In order to feed material in this manner, the end portions 323a–i may be located adjacent a cross channel 330a–d, within the cross channel, through the cross channel, and/or otherwise located relative to another cross channel 320a–d and/or another mixing segment. For example, the end portion 323a of the mixing segment 322a is located relative to mixing segment 322b in order to help feed material to the mixing segment 322b. The mixing segment 322b is designed to receive material from the cross channel 330a and material from the mixing segment 322a to encourage material through the cross channel 330b. As shown in FIG. 8, the end portion 323b of the mixing segment 322b is located within the cross channel 330b. Locating the end portion of the mixing segment within or through the cross channel tends to increase the cross flow between adjacent channel sections. It is understood that the end portion 323b may be located in other positions (e.g., adjacent the cross channel 330b) in order to achieve the desired cross flow pattern.

An amount of material passes through channel portion 324b to channel portion 324c, through the cross channel 330b. Portions of the primary flow in the channel portion 324c are received by the mixing segment 322c. The end portion 323c of the mixing segment 322c encourages material to travel to the intermediate mixing segment 322d. Material is then directed to the last mixing segment 322e of the channel portion 324b to be directed through the cross channel 330c. As illustrated in FIG. 8, the end portion 323e is located adjacent the cross channel 330c. It is understood that the end portion 323e may be positioned in other locations (e.g., within the cross channel, through the cross channel, or adjacent another cross channel and/or another mixing segment) in order to achieve the desired fluid flow characteristics.

A certain amount of fluid engages the mixing segment 322f within the channel portion 324d. An end portion 323f of the mixing segment 322f directs fluid to the mixing segment 322g. An end portion 323g of the mixing segment 322g causes movement of material to the mixing segments 322h, 322i and/or through the cross channel 330d. The end portion 322h of the mixing segment 322h further causes movement of material through the cross channel 330d and/or to the last mixing segment 322i. Finally, the end portion 323i of the mixing segment 322i causes movement of portions of the material through the cross channel 330d. As shown in FIG. 8, the end portion 323i of the mixing segment 322i is located within the cross channel 330d. It will be appreciated that the end portion 323i of the mixing segment 322i may be positioned in other locations depending upon the desired mixing characteristics.

As illustrated in the various exemplary embodiments, the cross channels of the primary flight may be arranged in any number of ways. For instance, as illustrated in the embodiments of FIGS. 3 and 7, the cross channels 30, 230 may be arranged along a plane 26, 226 including the longitudinal axis of the feed screw 10. The cross channels may also be aligned along a path 327 at an angle with respect to the plane 326 as illustrated in FIG. 8. In still another embodiment, the cross channels 430 may be randomly oriented relative to one another as shown in FIG. 9.

As further illustrated in the various exemplary embodiments of the present invention, the primary flight may include one or more cross channels per feed screw rotation. For instance, as illustrated in FIG. 8, each rotation of the feed screw includes one cross channel 330. It will be appreciated that the embodiment of FIG. 8 could include additional cross channels per rotation in order to have a desirable effect on the flow characteristics of the material.

As illustrated in the embodiments of FIGS. 3 and 7, each rotation of the feed screw may include two cross channels 30, 230. The cross channels may be aligned along a plane including the longitudinal axis. It will be appreciated that the embodiments of FIGS. 3 and 7 could include a different number of cross channels per rotation of the feed screw. For instance, additional sets may be provided that are aligned with another plane including the longitudinal axis. For instance, there could be four cross channels per feed screw rotation wherein each pair are defined along a common plane. In other embodiments, additional planes are provided that each are aligned with an additional set of channels. Although not shown in FIGS. 3 and 7, it is understood that an odd number of cross channels may be provided per feed screw rotation. In addition, the cross channels may be randomly located relative to one another.

In other embodiments of the present invention, a different number of cross channels may be provided per screw rotation. For instance, as shown in FIG. 9, the mixing section 418 illustrates an increasing number of cross channels 430a–d through the first, second, third and forth rotational portions 420a, 420b, 420c, 420d, of the primary flight 420. In the illustrated example, the first portion 420a includes on cross channel 430a, the second portion 420b includes two cross channels 430b, the third portion 420c includes three cross channels 430c, and the fourth portion 420d includes for cross channels 430d. The increased number of cross channels enhances the cross flow between adjacent portions 424a–e of the helical channel as the material approaches the discharge end of the feed screw.

In addition or alternatively, the mixing segments may be arranged to change the mixing characteristics of the mixing section 418. In one embodiment, the number of mixing segments are changed from one portion of the helical channel to another; thereby changing the mixing effect of the mixing section 418. As illustrated in FIG. 9 for example, the first portion 424a includes one cross channel 430a without an associated mixing flight. The combination of one cross channel with no mixing flights minimizes cross flow, if any, between the first portion 424a and the second portion 424b of the helical channel.

As further illustrated in FIG. 9, the second portion 424b of the helical channel includes one mixing segment 422b. In addition, the second rotational portion 420b of the primary flight 420 defines two cross channels 430b. The mixing segment 422b may be arranged such that the end portion 423b is located intermediate between the two cross channels 430b as shown in FIG. 9. Alternatively, the end portion 423b may be located in other locations (e.g., adjacent, within, or through one of the cross channels 430b).

The third portion 424c of the helical channel is illustrated as including three mixing segments 422c aligned with a corresponding one of three cross channels 430c defined in the third rotational portion 420c of the primary flight. The fourth rotational portion 420d of the primary flight is illustrated as including four cross channels 430d. More than four mixing segments 422d are located in the fourth portion 424d of the helical channel.

In order to further influence the cross flow of material through the corresponding cross channels, the height of the mixing segment(s) and/or flight(s) may be modified. For instance, in FIG. 7, the mixing segment/flight 222 may have a relatively small height at the beginning of the mixing section (e.g., near 222a) to minimize cross flow while gradually, continuously, or incrementally increasing in height to a maximum height near the end of the mixing section (e.g., near 222b) to maximize cross flow. Similarly, as illustrated in FIGS. 3, 8 and 9, the mixing segments towards the beginning of the mixing section may have a smaller height when compared to the mixing segments towards the end of the mixing section.

While the above alternative examples include illustrations that increase the chaotic and distributive mixing of material through the mixing section, it is understood that the arrangement may be reversed in situations wherein the mixing action is greatest at the beginning of the mixing section and the least towards the discharge end of the mixing section.

The mixing segments may be used in different processes. For example, the mixing segment may be used with a feed apparatus. In one particular example, as shown in FIG. 1, a feed apparatus 100 may be provided. Solid and/or liquid material is introduced at the inlet 112 to be conveyed and mixed by a feed screw 10 that rotates within the barrel 116. The material then exits the barrel 116 through the discharge 118. In one particular application, solid particulate resinous materials and/or other materials are stored in a hopper or other container (not shown) in communication with the inlet 112. The feed section 12 of the feed screw 10 receives the materials and conveys the material with the primary flight 20, as the feed screw 10 rotates. The material is conveyed generally in a direction 36 that is defined as the direction generally extending from one end of the feed screw 10 to another end of the feed screw 10. The direction 36 may also be defined as the direction generally extending from the inlet 112 to the discharge 118. A heat source (not shown) may be provided adjacent the feed section 12 of the feed screw 10 (and/or at any other location along the barrel 116) to assist in melting the material as it is conveyed by the feed screw 10.

The material may then pass through a transition section 14 to gradually reduce the volume of material being transported per unit of length. The material is compressed to remove spaces between any remaining material particulate. A heat source (not shown) may also be provided adjacent the transition section 14 to further melt the material and/or maintain the material in a melted state.

The material then enters a metering section 16 wherein all of the material achieves a melted or molten state. Chaotic and distributive mixing occurs as the material passes through the mixing section 18 of the metering section 16. The positive helical arrangement of the primary flight and mixing segment(s) flight(s) allow the mixing section 18 to encourage primarily or exclusive forward movement (i.e., substantially in direction 36) of material during the mixing process with substantially no back flow of material. Minimizing back flow is important to reduce or eliminate dead spots where the fluid flow would otherwise stagnate and thereby degrade and further preventing inconsistent fluid properties throughout mixing section 18. Accordingly, the mixing section 18 of the present invention is useful to discharge materials that are sensitive to thermal degradation since a forward mixing action prevents opportunities for the material to stagnate. Moreover, the chaotic and distributive mixing nature of the mixing section 18 achieves uniformity fluid characteristics throughout the discharge stream.

FIG. 3 illustrates the chaotic and distributive mixing of the mixing section 18 that maintains a positive fluid flow generally in the direction 36. As the feed screw 10 rotates, the primary flight 20 encourages movement of material generally in the direction 36. Portions of the fluid are directed by the mixing segment(s) 22 or mixing flight(s) 22 such that a positive cross flow in direction 36 (i.e., generally in a positive direction along the x-axis) is maintained through cross channels 30 defined in the primary flight between adjacent portions of the helical channel 24. The mixing flight 22 may be broken (as shown in FIG. 3) such that ends of the mixing flight are located adjacent a corresponding cross channel 30 to feed material through the cross channel 30. As shown in FIG. 3a, and described above, the mixing segment or flight 22 has a height that is less than the primary flight 20. Accordingly, some material may still pass over the top of the mixing segment or flight 22, rather than flowing through the cross flow channel 30, thereby encouraging chaotic and distributive mixing of the material to maintain consistent fluid characteristics through the flow.

The foregoing description of the various embodiments of the invention has been presented for the purposes of illustration and description. It is not intended to be exhaustive or to limit the invention to the precise form disclosed. Many alternatives, modifications and variations will be apparent to those skilled in the art of the above teaching. Accordingly, this invention is intended to embrace all alternatives, modifications and variations that have been discussed herein, and others that fall within the broad scope of the claims.

What is claimed is:

1. A mixing section for a feed screw comprising:
   a) a body portion defined along a longitudinal axis and extending in a first direction along the longitudinal axis,
   b) a primary flight defining a helical channel, wherein the primary flight is helically wound along a primary flight helical path in the first direction about the longitudinal axis, the primary flight helical path forming a first acute angle with respect to an x-axis that is parallel to the longitudinal axis, and the primary flight being helically wound clockwise in the first direction about the longitudinal axis along at least a portion of the length of the mixing section, the primary flight defining a cross channel to allow fluid communication between adjacent portions of the helical channel, wherein the cross channel is defined along a cross channel helical path about the longitudinal axis, the cross channel helical path being helically wound clockwise in the first direction about the longitudinal axis along at least a portion of the length of the mixing section, the cross channel helical path forming a second acute angle with respect to the x-axis that is smaller than the first angle, and further wherein a y-axis extends perpendicular to the x-axis, thereby defining four quadrants with the first and second acute angles being located in the same quadrant, and
   c) a mixing segment extending along a mixing segment path and positioned within the helical channel of the primary flight, the mixing segment path forming a third acute angle with respect to the x-axis, wherein the first, second, and third angles are in the same quadrant.

2. The mixing section of claim 1, wherein the primary flight includes a side wall that defines the cross channel and is oriented generally parallel to the direction of the cross channel helical path.

3. The mixing section of claim 1, wherein side walls of the cross channel of the primary flight defining the cross channel are each parallel to the direction of the cross channel helical path.

4. The mixing section of claim 1, wherein the third angle is less than the first angle.

5. The mixing section of claim 1, wherein the third angle is less than the second angle.

6. The mixing section of claim 1, wherein the mixing segment is helically wound along the mixing segment path about the longitudinal axis such that the mixing segment path comprises a helical path.

7. The mixing section of claim 1, wherein the third acute angle is different than the first acute angle.

8. A mixing section for a feed screw, the mixing section comprising:
   a) an elongated body including a length extending along a longitudinal axis,
   b) a primary flight defining a helical channel and extending from at least a portion of the length of the elongated body, the primary flight helically wound about the longitudinal axis along a primary flight helical path forming a primary flight acute angle with respect to an x-axis that is parallel to the longitudinal axis, the primary flight helical path is helically wound clockwise in a first direction about the longitudinal axis along at least a portion of the length of the mixing section, wherein the first direction is defined as generally extending from one end of the mixing section to another end of the mixing section, the primary flight defining a cross channel to allow fluid communication between adjacent portions of the helical channel, wherein the cross channel is defined along a cross channel helical path about the longitudinal axis, the cross channel helical path is helically wound clockwise in the first direction about the longitudinal axis along at least a portion of the length of the mixing segment, wherein the cross channel helical path forms a cross channel acute angle with respect to the x-axis, and
   c) a mixing segment extending from the elongated body and extending along a mixing segment path, the mixing segment path forming a mixing segment acute angle with respect to the x-axis that is less than the cross channel acute angle and is different from the primary flight acute angle, and a y-axis extends perpendicular to the x-axis, thereby defining four quadrants with the primary flight acute angle, cross channel acute angle and mixing segment acute angle being located in the same quadrant, wherein the mixing section is adapted to be rotated about the longitudinal axis such that the primary flight may cause movement of material at least primarily in the first direction while the mixing segment may cause at least partial cross flow of material through the cross channel substantially in the first direction.

9. The mixing section of claim 8, wherein an end of the mixing segment is located adjacent the cross channel.

10. The mixing section of claim 8, wherein at least one of the primary flight and mixing segment is adapted to at least substantially prevent reverse cross flow of material through the cross channel in a second direction opposite the first direction.

11. The mixing section of claim 8, wherein the mixing segment is disposed within the helical channel.

12. The mixing section of claim 8, wherein the elongated body is generally cylindrical.

13. The mixing section of claim 8, wherein the cross channel acute angle is less than the primary flight acute angle.

14. The mixing section of claim 8, wherein the mixing segment acute angle is less than the primary flight acute angle.

15. The mixing section of claim 8, wherein the mixing segment comprises a plurality of mixing segments.

16. The mixing section of claim 15, wherein the plurality of mixing segments define a mixing flight with a cross channel.

17. The mixing section of claim 16, wherein the primary flight defines a first pitch and the mixing flight defines a second pitch.

18. The mixing section of claim 17, wherein the second pitch is greater than the first pitch.

19. The mixing section of claim 16, wherein the cross channel of the mixing flight overlaps the cross channel of the primary flight.

20. The mixing section of claim 16, wherein a common helical path that is helically wound clockwise in the first direction about the longitudinal axis extends through the cross channel of the primary flight and the cross channel of the mixing flight.

21. The mixing section of claim 16, wherein the mixing segment flight is helically wound along a mixing segment helical path about the longitudinal axis.

22. The mixing section of claim 15, wherein the plurality of mixing segments extend along a mixing segment helical path about the longitudinal axis.

23. The mixing section of claim 8, wherein the mixing segment has a height relative to the elongated body that is less than the height of the primary flight relative to the elongated body.

24. The mixing section of claim 8, wherein the cross channel of the primary flight comprises a plurality of cross channels.

25. The mixing section of claim 24, wherein a plurality of cross channels of the primary flight are defined along a cross channel helical path that is wound about the longitudinal axis.

26. The mixing section of claim 25, wherein the x-axis extends through a plurality of the cross channels of the primary flight.

27. The mixing section of claim 24, wherein the mixing segment comprises a plurality of mixing segments defining a mixing flight, the mixing flight including a plurality of cross channels.

28. The mixing section of claim 27, wherein a plurality of cross channels of the mixing flight overlap a corresponding one of a plurality of cross channels of the primary flight.

29. The mixing section of claim 27, wherein a common helical path is helically wound clockwise in the first direction about the longitudinal axis, the common helical path extends through a plurality of cross channels of the primary and mixing flights.

30. The mixing section of claim 29, wherein the x-axis extends through a plurality of the cross channels of the primary flight and the mixing flight.

31. The mixing section of claim 8, wherein the mixing segment is helically wound along the mixing segment path about the longitudinal axis such that the mixing segment path comprises a helical path.

32. A mixing section for a feed screw comprising:
a) a body portion defined along a longitudinal axis and extending in a first direction along the longitudinal axis,
b) a primary flight defining a helical channel, wherein the primary flight is helically wound along a primary flight helical path in the first direction about the longitudinal axis, the primary flight helical path forming a first acute angle with respect to an x-axis that is parallel to the longitudinal axis, and the primary flight being helically wound clockwise in the first direction about the longitudinal axis along at least a portion of the length of the mixing section, the primary flight defining a cross channel to allow fluid communication between adjacent portions of the helical channel, wherein the cross channel is defined along a cross channel helical path about the longitudinal axis, the cross channel helical path being helically wound clockwise in the first direction about the longitudinal axis along at least a portion of the length of the mixing section, the cross channel helical path forming a second acute angle with respect to the x-axis that is smaller than the first angle, and further wherein a y-axis extends perpendicular to the x-axis, thereby defining four quadrants, and
c) a mixing segment extending along a mixing segment path, the mixing segment path forming a third acute angle with respect to the x-axis, wherein the third acute angle is less than the second acute angle and wherein the first, second, and third acute angles are in the same quadrant.

33. A mixing section for a feed screw comprising:
a) a body portion defined along a longitudinal axis and extending in a first direction along the longitudinal axis,
b) a primary flight defining a helical channel, wherein the primary flight is helically wound along a primary flight helical path in the first direction about the longitudinal axis, the primary flight helical path forming a first acute angle with respect to an x-axis that is parallel to the longitudinal axis, and the primary flight being helically wound clockwise in the first direction about the longitudinal axis along at least a portion of the length of the mixing section, the primary flight defining a cross channel to allow fluid communication between adjacent portions of the helical channel, wherein the cross channel is defined along a cross channel helical path about the longitudinal axis, the cross channel helical path being helically wound clockwise in the first direction about the longitudinal axis along at least a portion of the length of the mixing section, the cross channel helical path forming a second acute angle with respect to the x-axis that is smaller than the first angle, and further wherein a y-axis extends perpendicular to the x-axis, thereby defining four quadrants with the first and second acute angles being located in the same quadrant, and
c) a mixing segment extending along a mixing segment path and positioned in the helical channel of the primary flight and arranged at a third acute angle with respect to the x-axis, wherein the third acute angle is different than the first acute angle.

* * * * *